(12) United States Patent
Flavin (10) Patent No.: US 8,375,086 B2
(45) Date of Patent: Feb. 12, 2013

(54) SHARED STATE MANAGER AND SYSTEM AND METHOD FOR COLLABORATION

(75) Inventor: Robert A. Flavin, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 795 days.

(21) Appl. No.: 11/755,967

(22) Filed: May 31, 2007

(65) Prior Publication Data

US 2008/0301228 A1    Dec. 4, 2008

(51) Int. Cl.
*G06F 15/16* (2006.01)
*G06F 3/00* (2006.01)
(52) U.S. Cl. ........................................ 709/205; 715/751
(58) Field of Classification Search .................. 709/201, 709/204–207; 726/4; 715/751, 255
See application file for complete search history.

(56) References Cited

U.S. PATENT DOCUMENTS

| | | | | |
|---|---|---|---|---|
| 5,008,853 | A * | 4/1991 | Bly et al. | 715/751 |
| 5,412,772 | A * | 5/1995 | Monson | 715/746 |
| 6,101,512 | A * | 8/2000 | DeRose et al. | 715/234 |
| 6,453,333 | B1 * | 9/2002 | Glynias et al. | 709/202 |
| 6,553,402 | B1 * | 4/2003 | Makarios et al. | 709/201 |
| 6,721,871 | B2 * | 4/2004 | Piispanen et al. | 712/1 |
| 7,370,269 | B1 * | 5/2008 | Prabhu et al. | 715/230 |
| 2003/0225764 | A1 * | 12/2003 | Smith et al. | 707/9 |
| 2004/0181577 | A1 * | 9/2004 | Skurikhin et al. | 709/204 |
| 2006/0053196 | A1 * | 3/2006 | Spataro et al. | 709/205 |
| 2006/0080316 | A1 * | 4/2006 | Gilmore et al. | 707/9 |

* cited by examiner

*Primary Examiner* — Chirag R Patel
(74) *Attorney, Agent, or Firm* — Anne V. Dougherty, Esq.; McGinn IP Law Group, PLLC (57) ABSTRACT

A shared state manager (SSM) for collaboration includes an updating module for updating a shared state of data based on a request to edit the data made by a client, and a notifying module for, upon the updating the shared state, notifying another client of the updated state.

26 Claims, 6 Drawing Sheets

Fig. 7

US 8,375,086 B2

SHARED STATE MANAGER AND SYSTEM AND METHOD FOR COLLABORATION

BACKGROUND OF THE INVENTION

1. Field of the Invention

The present invention generally relates to system and method for collaboration and more particularly, to a system and method for collaboration which may include notifying another user of an updated shared state of data.

2. Description of the Related Art

Conventional systems exist for allowing people to remotely collaborate with each other. Many of these conventional systems utilize the Internet.

For example, such systems may include Web collaboration tools such as Wikis, Blogs, and Instant Messaging; Web content generation tools such as FrontPage, JavaServerPages, ActiveServerPages, and personal home page language (PHP); Data Synchronization and Replication services; Shared Editors of the 1990s, "Groove"; Editors with annotations, such as Microsoft Word®; Programming models such as "Linda", "TSpaces", "JSpaces" and "Jini", distributed programming; Remote Method Invocation; "Publish/Subscribe" communication tools; Networked or multiplayer computer games; extensible mark-up language (XML), hypertext mark-up langugage (HTML), and game maker language (GML); Forums; Internet Relay Chat (IRC); sending annotated documents by e-mail; and Shared White Board and Shared Screen applications.

However, each of these conventional systems is missing some valuable features and is, therefore, only a partial solution. Such valuable features may include realtime interaction, persistence of information, richness of content, ability to organize information and access control.

SUMMARY OF THE INVENTION

In view of the foregoing and other exemplary problems, drawbacks, and disadvantages of the conventional methods and structures, a purpose of the exemplary aspects of the present invention is to provide a system and method which may help to provide an improved "interactivity" between clients on a network (e.g., the Internet) and/or between a client and a server on the network.

An exemplary aspect of the present invention is directed to a shared state manager (SSM) for collaboration that includes an updating module for updating a shared state of data (e.g., document content data) based on a request to edit the data made by a client, and a notifying module for, upon the updating the shared state of the data, notifying another client of the updated state.

Another exemplary aspect of the present invention is directed to a system for collaboration that includes a plurality of clients, and a server connected to a network. The server includes a shared state manager (SSM) for collaboration, the SSM being accessible by the plurality of clients and including an updating module for updating a shared state of data based on a request to edit the data made by a client, and a notifying module for, upon the updating the shared state of the data, notifying another client of the updated state.

Another exemplary aspect of the present invention is directed to a method of collaboration. The method includes updating a shared state of the data based on a request to edit the data made by a client, and upon the updating the shared state of the data, notifying another client of the updated state.

Another aspect of the present invention is directed to a programmable storage medium tangibly embodying a program of machine-readable instructions executable by a digital processing apparatus to perform the computer method according to the exemplary aspects of the present invention.

In still another aspect, the computer method according to the exemplary aspects of the present invention may include deploying computing infrastructure in which computer-readable code is integrated into a computing system, such that the code and the computing system combine to perform the method.

With its unique and novel features, the present invention provides a system and method for collaboration which may help to provide an improved "interactivity" between clients on a network (e.g., the Internet) and/or between a client and a server on the network.

BRIEF DESCRIPTION OF THE DRAWINGS

The foregoing and other exemplary purposes, aspects and advantages will be better understood from the following detailed description of an exemplary embodiment of the invention with reference to the drawings, in which.

DETAILED DESCRIPTION OF EXEMPLARY EMBODIMENTS OF THE INVENTION

Referring now to the drawings, and more particularly to FIGS. 1-8, there are shown exemplary embodiments of the method and structures of the present invention.

Figure 1:
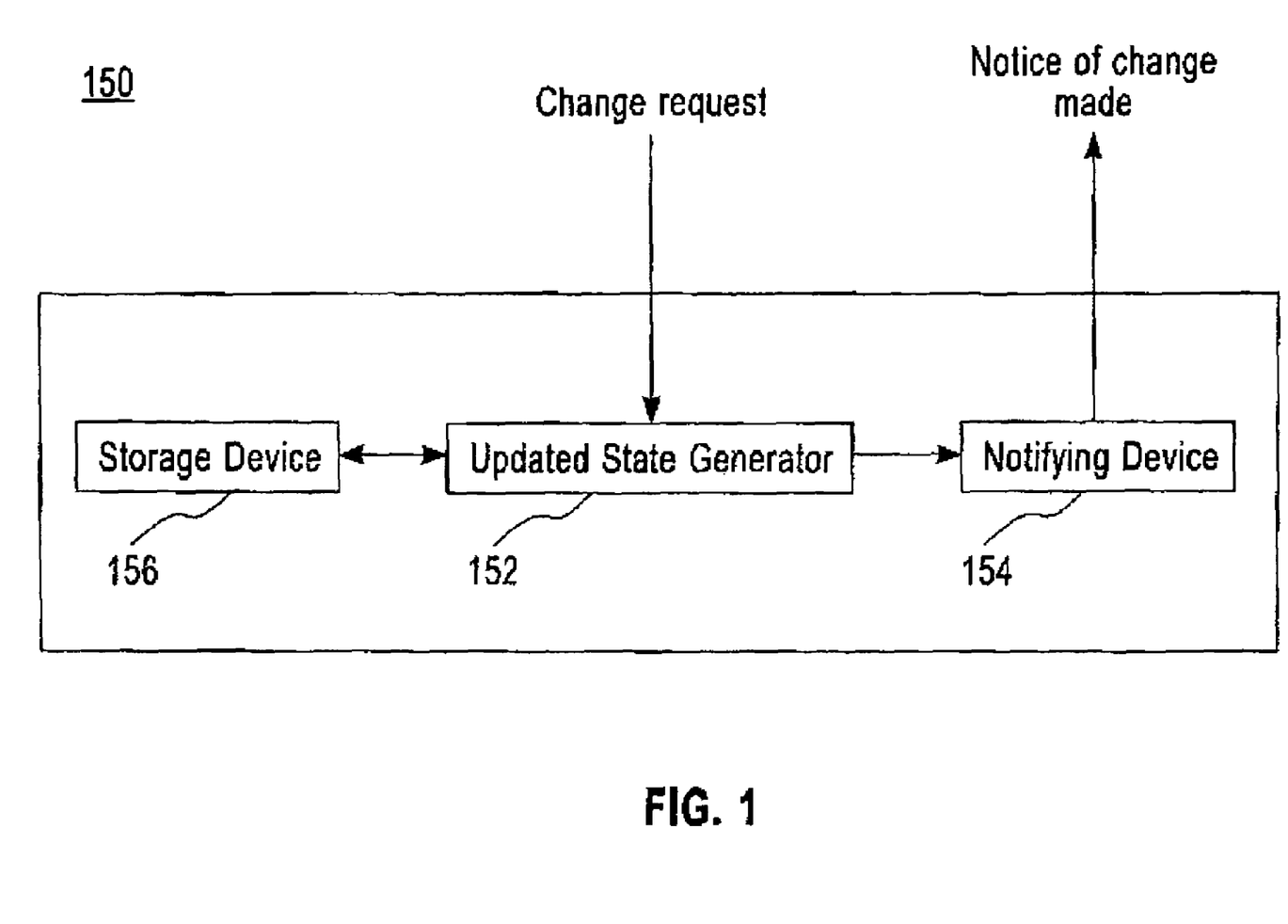
FIG. 1 illustrates a shared state manager (SSM) 150 according to an exemplary aspect of the present invention.

FIG. 1 illustrates a shared state manager (SSM) 150 for collaboration (e.g., collaborative editing of document content data) according to an exemplary aspect of the present invention. As illustrated in FIG. 1, the shared state manager 150 may include an updating module 152 (e.g., updating state generator) for updating a shared state of data based on a request to edit the data made by a client (e.g., a user interface such as a graphical user interface (GUI), or a computer application which does not require a user), and a notifying module 154 (e.g., notifying device) for, upon the updating of the shared state of data, notifying another client of the updated state.

The data may include, for example, auction data for engaging in an online auction, or game data for playing a game between two or more clients on a network of clients (e.g., user terminals). The data may also include, for example, document content data such as data stored on a storage device (e.g., a network server) connected to the network The shared state manager 150 may also include an authorization module for confirming an authorization of the request, and a reply module for generating a reply to the request to the client. The shared state manager 150 may further include a storage device 156 (e.g., disk, RAM, etc.) for storing SSM application software for controlling the request to edit the content, and causing the notifying module to notify another client of the updated state of content. The storage device 156 (or another storage device) may also store a shared state object (SSO) which includes a representation of the shared state of the data.

The shared state manager 150 may be included, for example, in a server which may be connected to a network (e.g., the Internet). Further, the data may include, for example, Web page data stored on the server.

Figure 2:
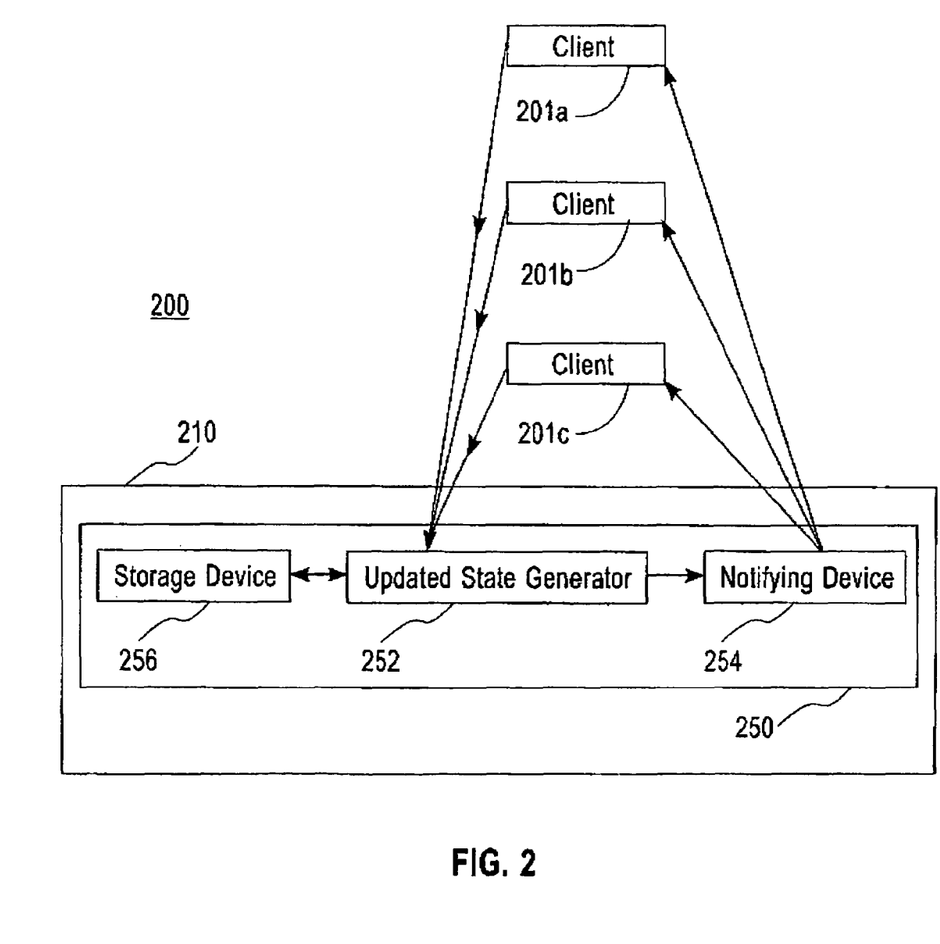
FIG. 2 illustrates a system 200 for collaboration according to an exemplary aspect of the present invention.

FIG. 2 illustrates a system 200 for collaboration (e.g., collaborative editing of document content data) according to an exemplary aspect of the present invention. As illustrated in FIG. 2, the system 200 includes a plurality of clients 201a, 201b, 201c, etc. (e.g., user interfaces) which may be connected via a network (e.g., the Internet), and a server 210 which includes a shared state manager (SSM) 250 for collaboration, the SSM being accessible by the plurality of clients and including an updating module 252 for updating a shared state of data based on a request to edit the data made by a client, a notifying module 254 for, upon the updating the shared state of the data, notifying another client of the updated state.

The shared state manager 250 (or the server 210) may further include a storage device 256 (e.g., disk, RAM, etc.) for storing SSM application software for controlling the request to edit the data, and causing the notifying module to notify another client of the updated state of data. The storage device 256 (or another storage device in the server 210) may also store a shared state object (SSO) which includes a representation of the shared state of the data.

Figure 3:
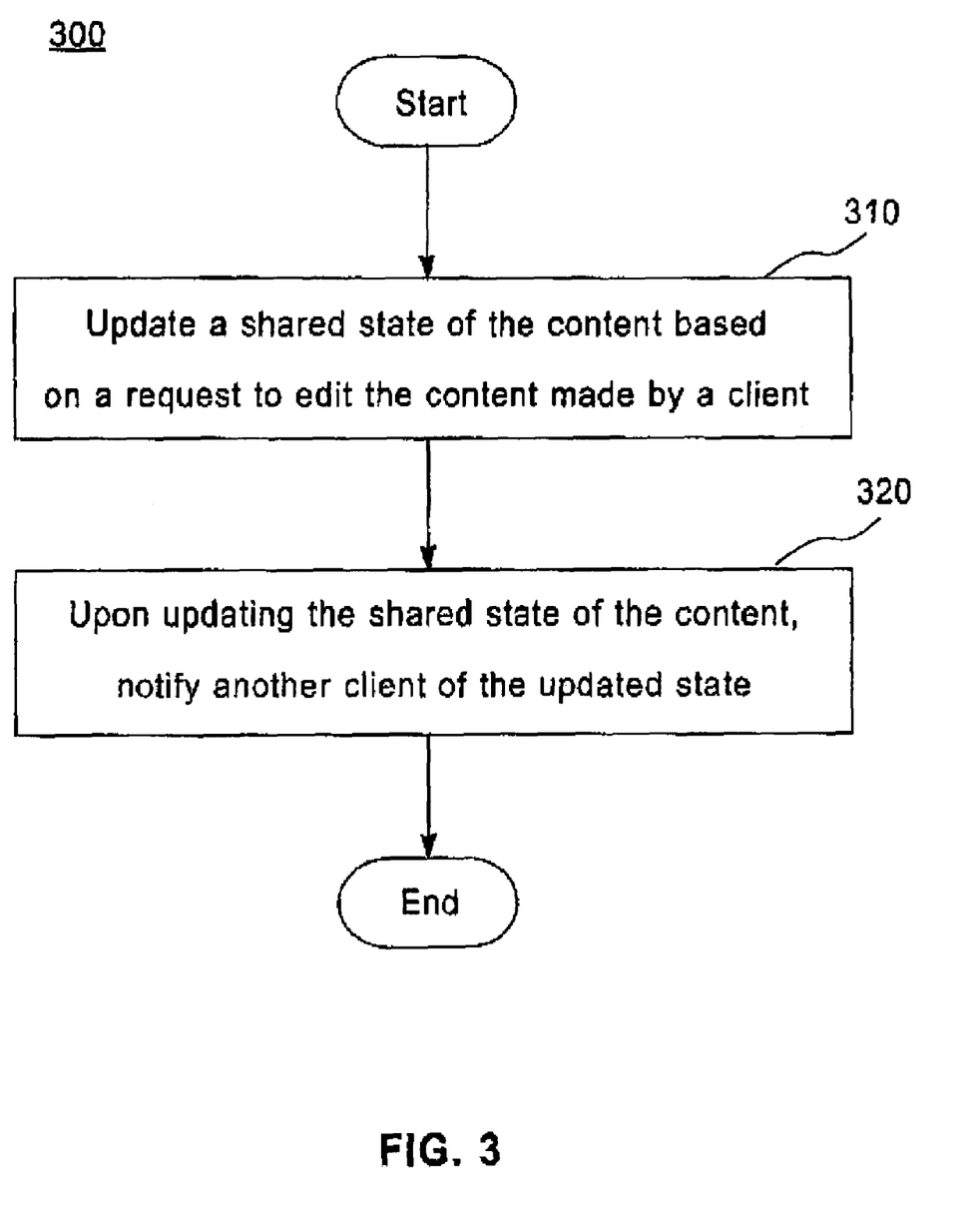
FIG. 3 illustrates a method 300 of collaboration according to an exemplary aspect of the present invention.

FIG. 3 illustrates a method 300 of collaboration (e.g., collaborative editing of document content data), according to another exemplary aspect of the present invention. As illustrated in FIG. 3, the method 300 includes updating (310) a shared state of the data based on a request to edit the data made by a client, and upon the updating the shared state of the data, notifying (320) another client of the updated state.

Overview

The system 200 may help to facilitate collaboration on a network (e.g., the Internet). For example, the system 200 may provide the ability to access and edit a document (e.g., document content data) in realtime or asynchronously over the network. In particular, the system may permit people to share and edit a document (e.g., a Web page document) in realtime.

The system 200 may include a client which may utilize a standard Web browser. That is, the system 200 does not necessarily require installation of any new software on a client computer. Further, the system 200 may also provide a client with fine-grained access control of the content of the document.

A benefit of the system 200 is that it may allow any number of people to view the same Web page (e.g., the same state of the Web page). These people can edit the page (e.g., Web page content data), and these edits may appear (e.g., immediately appear within a few seconds) on the Web browsers of other clients (e.g., all other users, subject to each user's access control) on the network.

The system 200 may store and use scripts in the Web pages of Web browsers that use bidirectional communication to a Web server which reflects changes (e.g., any changes) a user may make to the Web page content data, to other users (e.g., all other users). Further, although the system 200 may be described as being implemented on Web browsers using HTML, the system 200 can also be built on other clients such as the Open Office editors.

The inventors have implemented the system 200 in a "Live-Book" prototype which is implemented in Javascript and Java on Web Browsers as the client, and uses a Web server written in "C". In this prototype, the system may take user input, send it to the server which processes the user input and causes the user input to be sent to the other clients (e.g., all of the other clients) who may be interested in the same data (e.g., Web page content data).

Detailed Discussion

The present invention may provide an efficient and convenient method of realtime sharing of data (e.g., document content data) and collaboration on that data. An exemplary aspect of the present invention includes a system 200 where a number of clients (e.g., users) may view the same Web page (e.g., a shared state of the Web page) on standard Web browsers and, subject to access control, the clients (e.g., users) can collaboratively edit and/or annotate the Web page content data.

Importantly, the clients (e.g., users) may immediately see the updated data on their Web browsers without needing to "refresh" the page. More broadly, the system 200 may support realtime distribution and control of a "shared state" between "applications", where that shared state may be stored "abstractly" and "filtered" and "translated" into different presentation formats for different clients.

The system 200 may provide significant improvements over the conventional systems and methods in which standard for information sharing is static Web pages, or Web pages that are composed on the fly from templates and data. Indeed, in such conventional systems and methods, communication may only be one way—from the author/publisher to the readers.

For example, Wikis are Web pages where users can go into an editing mode, edit the whole page and save the updated page to the server. Other users do not see the updates unless they refresh the page from the server. Instant Messaging on the other hand has realtime sharing of data (e.g., content data), but typically lacks the persistence, structure, richness, and public access (without invitation) that Web content data has.

In contrast to such conventional systems and methods, the system 200 may offer the realtime interaction of instant messaging, with the persistence, structure and richness of data (e.g., document content data) like Web pages. The present invention may also introduce 1) the ability to create personalized views of the shared state of data (e.g., shared content) based on preferences and access control, 2) to permit shared editing of data across different display formats (such as between HTML Web browsers and popular office document editor formats like .doc and .pdf (e.g., Microsoft Word® and Portable Document Format (PDF)), and 3) fine grained control of shared data (e.g., shared content)—such as control at the level of individual sentences rather than entire documents.

As illustrated in FIG. 2, the system 200 according to an exemplary aspect of the present invention may include clients 201a, 201b, 201c, etc. (e.g., user interfaces such as browsers, editors or graphical or text-based user interfaces, or computer programs without a person) and a server 210. The server 210 may include a shared state manager (SSM) 250. The SSM 250 (or the server 210) may include one or more memory devices for storing one or more SSM applications (e.g., SSM application software), and at least one object store where a Shared State Object (SSO) may reside.

The SSM application may include software that controls changes to the shared state and causes clients to be notified of those changes as appropriate. Examples of SSM applications may include, for example, a Document Sharing SSM application, a Tic-Tac-Toe game SSM application and a railroad train dispatching SSM application.

The Shared State Object may be a direct or 'literal' representation of the stared state (e.g., if the state is an HTML document, there is a node in the SSO 'tree' in one to one correspondence to each node in the HTML document object model (DOM)). Alternatively, the Shared State Object can be abstract, in which case the state information may not appear in the same order or structure as the an HTML page, and there may not be a one to one correspondence between the SSO nodes and the HTML DOM.

The SSO may logically contain the shared state information and may also contain: 1) a mechanism for binding to software (e.g., SSM application functions) that may control access to the shared state and changes to the shared state, 2) semantic information (e.g., arbitrarily extensible tags associated with fine grain nodes of the shared state to convey other information about the content), 3) history information (e.g., dates of changes, identification of the client (e.g., user) who made the change, previous states (e.g., versions) of the content, etc.), 4) client information (e.g., information about a client (e.g., user) such as client membership, client roles, client personal or business profiles and client rights), and 5) "markup" templates for rendering abstract data (e.g., abstract content) into different display formats and/or different views.

An Exemplary Aspect of the Present Invention Implemented on the Web

In an exemplary aspect of the present invention, the system 200 is implemented on the World Wide Web (e.g., on the Internet) where the clients 201 and the SSM 250 may be connected and communicate via the World Wide Web (hereinafter, the "Web).

Wikis and Blogs may be a first step toward making the "read only" Web a place where users can collaborate—in real-time (e.g., synchronously) or asynchronously—to create or discuss information. Current Web client/server technology is just at the edge of being able to users such an environment.

The present invention includes a manner of adopting of the technology of the inventors' "LiveBook" prototype (e.g., combining the real-time interactivity of instant messaging with the richness, persistence and structure of the Web) and provides an architecture for implementing these "Shared State" applications in an open development environment.

That is, currently content on the Web is basically read/only. A user of the Web cannot ask questions regarding Web content data, add comments to the Web content data, or contribute to the Web content data. Conventional client/server design of the Web inhibits such real-time, two-way collaboration.

A purpose of the present invention is to provide the user with an ability to contribute to Web content data—like a Wiki—but with the real-time interaction of instant messaging and perhaps a measure of control and structure. The present invention may provide an open architecture that allows users of off the shelf Web browsers, and some non-HTML clients, to collaborate on Web content data in real-time.

An end user experience of using the present invention may include this: any number of users may fire up their Web browsers or other client software and look at a Web page, and any user (e.g., authorized user) can annotate or edit the Web page and their edits immediately appear on the screens of the other users.

That is, the present invention may allow users to update Web pages. For example, it may allow employees to add questions and comments and to update out of date information on a corporate web site. Since the server can mediate the requests to change the data (e.g., content data), the system can provide fine grained control of such updates.

This advance in the power of the Web may be enabled (at least in part) by the ability of client side scripts to access and dynamically change the W3C DOM and the emergence of DOM events in scripting languages. However, conventional efforts to provide some "interactivity" to the Web have been inhibited by the traditional 'client server architecture' that assume that clients initiate requests to servers and not the other way around.

Wikis and Blogs (like Web conferences before them), are a movement to make the Web a two-way communication vehicle. Live editing gives Wikis more of the interactivity of instant messaging. It also can allow users to edit data (e.g., document content data) in a more "what you see is what you get" mode rather changing the visual context by shifting to a Wiki editing screen. The live interaction reduces or eliminates editing conflicts when multiple people edit a Wiki page at the same time.

The inventors have found that by using an "abstract representation of content" described below, fine grained access control can be applied to Wikis and Blogs. (However, as noted above, this is not limited to just Web pages or documents, but may be implemented in other mechanisms which use a "Shared State" of information (e.g., information that a group of users (e.g., more than one user) have some degree of ability to read, write or edit)).

As used herein, the term "live" may include the concepts: 1) that the client (e.g., user) may always see up to date information, 2) that a client may not be the only person or agent that wants to read, write or edit the data, and 3) that a plurality of clients may be distributed around the network. A client may include a user (e.g., person) at a user interface as well as a software agent.

It should be noted that a client (e.g., user) may be disconnected from the network at times. Further, the term "realtime" does not necessarily mean synchronized to the millisecond, but means essentially or substantially current.

That is, the present invention may be implemented on a Web that is live, distributed and multi-user. The present invention may provide this by using a novel architecture (e.g. architecture of Share State Applications), a novel representation of data (e.g., document content data), a novel manner of rendering data (e.g., document content data), and/or a novel manner of providing an "open" architecture.

Figure 4:
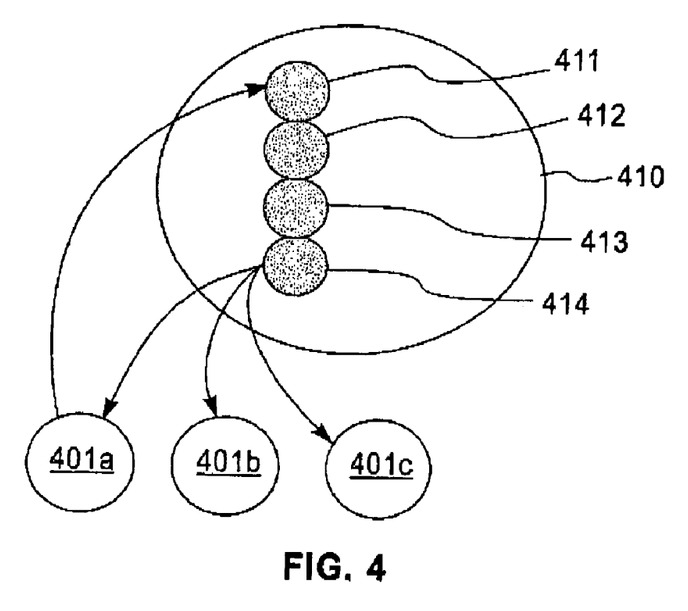
FIG. 4 illustrates another exemplary system 400 for providing collaboration according an exemplary aspect of the present invention.

FIG. 4 illustrates an exemplary system 400 for providing collaboration according an exemplary aspect of the present invention. The system 400 includes a server 410 and clients 401*a*, 401*b*, and 401*c*. The server 410 may include a module 411 for authorizing user access, a module 412 for updating a local shared state tree, a module 413 for replying to a client request, and a module 414 for notifying a client (e.g., subscribers) of changes to a state.

A basic architecture of such a live editing system may include bunch of Web browsers all viewing the same page from a Web server. When any user makes a change to data (e.g., Web page content data for a page), the change is sent to the server 410 which updates its view of the data and notifies all the browsers on all of the clients 401*a*, 401*b*, 401*c*, etc. to update their data.

Thus, a common operation at the server 410 which may be used to implement this sharing includes determining whether client (e.g., user) is authorized to make the change, update the local shared state tree, reply to the client (e.g., user) request, and notify the clients (e.g., subscribers) of this change to the data (e.g., the shared state of the content).

More generally, in addition to Web browsers, other editors or client software could be used by the clients. When the server receives a request to change the data (e.g., document content data) it may modify or reject the request based on the "rules" or behaviors established for that application or content. Once the server has verified that the client (e.g., user) is authorized to make the sort of change requested, the server may update the server's copy of the shared state.

The "data" (e.g., content) may be considered more than simply data that is being shared as a Web page or document. Instead, "data" may be considered more generally as a collection or 'tree' of data or state information that is shared by the current users and other users who may access the content later.

Upon (e.g., immediately after) updating the state information, the server may send a response to the client to acknowledge the request. Importantly (e.g., after sending the response) the server may send a notification of the changed state to any or all of the clients, or subscribers, who are interested and authorized to know of the changed state.

The notification of change of state may include sufficient information for the client to maintain a replica of the shared state of the document locally. For a Web browser, the notification may be used to dynamically INSERT, REPLACE or DELETE HTML DOM elements from the document. Thus, the present invention may be considered as including essentially a Model View Controller design pattern for multi-user applications.

An important aspect of the present invention is that clients may initiate communication with a server (e.g., a Web server). A standard for a modem application of a Web page is that the page should be "live", multi-user and distributed. Conventionally, standalone programs and applications where users individually connected to a central server are the norm. In those applications that are connected to a server, each user is essentially unaware of the presence of other users. Applications may have downloaded some data, but a user's view frequently does not get updated until the user refreshes his screen or takes some action like pressing a key.

In a live environment such as in an exemplary aspect of the present invention, a user can change the shared data (e.g., shared information) at any time by sending a request to the server. If the server cannot initiate a communication to a client (such as in conventional systems) that client will not find out about the change until it contacts the server.

Thus, live software needs to depart from the conventional client/server model to a model where either the client or the server can initiate communications, or "push" to the other. If the client can accept requests from other software, then that client is accepting requests or commands from an outside source and is effectively a server.

The present invention may, therefore, utilize the term "mini-server" to describe a client in the present invention (e.g., a new-age client that may act as a server). The mini-server typically may only handle commands which cause the user's "view" of the shared state to be updated—but because it has crossed the Rubicon and may function as a server, it can do more.

In the present Application, the term "client" may refer to software, like a Web browser, that performs the tradition client role of being a user interface to a service, even though the software may accept commands like a server.

An implication of this two-way flow of commands between the "client" and the "server" is that communication protocols may need to be more symmetrical than the protocols in conventional systems. A number of techniques have been used to permit commands to be "pushed" to Web browsers, such as, for example, Polling and Listening on Sockets. However, Polling typically has high overhead or is not very responsive. Listening on a socket does not work through firewalls and may have security restrictions.

The Shared State Manager according to the present invention, however, may use Communication Plugins to be open to supporting whatever communication style or styles might be appropriate for an environment. A typical SSM communication style in a Web browser may use a Java Applet which starts a thread which initiates a command to the server. The server may not respond to the command until the server has something to tell the client. This approach may be very responsive, work with firewalls, and does not have the overhead of constant polling. It does mean that a transmission control protocol (TCP) session may be open for a client using the system, but this resource overhead is acceptable when considering the value that the resource provides, and when considering that the resource will only be needed until browsers catch up with the need for symmetrical communication.

An important feature of the present invention is the portion of the system that processes the requests and does the Authorization check, State Update, Replying and Notifying of clients (e.g., subscribers). This core management function can be embedded in a variety of servers, like Web servers or IBM Websphere or even in embedded in client software in cell phones or other devices. Because in the present invention clients may send requests to servers and servers may send requests to clients, the Shared State Manager (SSM) code may be useful in what is traditionally called the client as well as in the server.

The features that define the shared application may include: the Data Model of the state information (document), and the set of requests supported for changing the state. A common example of state information is the traditional Web page or document content. More abstractly, the state information may include any data is being shared by two or more clients (e.g., user terminals) on a network.

For simple shared editing of text, typical requests may include, for example, 1) INSERT a subtree after a specified node, 2) REPLACE a specified subtree with another, and 3) DELETE a specified subtree.

A practical list of requests might also include variants like 1) INSERT BEFORE (insert before the specified node), 2) INSERT FIRST CHILD (insert data as a child node of the node), 3) INSERT LAST CHILD (insert data as the last child of the node), 4) MOVE (move a subtree to a specified node), and 5) MOVE BEFORE (move a subtree before the specified node).

Other useful requests, which may go beyond simple editing, may include for example, 1) SCROLLTO which does not really change the shared state, but causes all user displays to scroll to show a particular part of a document, and 2) POINTTO which displays a user's icon or pointer at a particular part of the data (e.g., document content data).

In trying to move beyond thinking of these applications as being just shared text editing, one may consider an eBay-like online auction where, aside from a shared Web page, the shared state may include the "current bid" value and the "highest bidder's name" value. Aside from normal text editing, an application specific request such as BID, may be needed. The BID request contains the amount of the user's new bid as an argument.

An application specific function would be to determine whether the new bid is equal to or less than the current bid, and if so the BID request would be rejected, the shared state would not change and a failure response would be sent to the user. If, however, the new bid is more than the current bid, the new bid may be acceptable, the SSM would update the current bid and update the name of the current bid holder (e.g., the shared state). The SSM may also notify the clients to cause their browsers to reflect the new bid. These "commands" may be referred to as requests to convey the idea that the server may reject the "request" or alter the "request" before performing it.

The present invention may also scale to use on the Web. For each change to data (e.g., document content data), a notification may need to be sent to other clients (e.g., everyone viewing the document content data). Although this could potentially be a significant load, the present invention would not experience performance problems.

That is, the load should not present a problem with scaling the present invention to a much larger scale. A load on the server may increase with the number of pages served, the number of edits made and the number of users simultaneously viewing the pages. However, the present invention may include mitigating factors: 1) the server and network overhead for each edit is modest, 2) the incremental overhead per additional viewer may be only a small portion of the per edit overhead, 3) typical applications may not involve large numbers of editors of a single document, 4) the present invention may utilize low overhead broadcast communication techniques like "publish/subscribe" or multicast, and 5) the present invention may distribute the load over a network of peer servers.

In fact, human limitations to the usefulness of large numbers of editors (e.g., too many cooks spoil the broth) may outweigh any technical performance concerns in the present invention. That is, the rate that people surf through image packed Web pages may create much more system load than the load created by the rate of incremental updates to a page someone is sharing. Although there are a large number of valuable applications of Shared State that present at most a modest system load, if people use a shared state to perform demand applications where vast numbers of users are bombarding one object with edit requests, it should be considered a success.

An important feature of the claimed invention, is that it provides a novel manner of representing data (e.g., document content data).

In a conventional system, a computer knows little more about most data (e.g., documents Web pages, etc.) than a manual typewriter knows about the paper on which the typewriter is used. Conventionally, computers basically see data (e.g., documents) as a string of letters of various sizes and colors with some images shuffled in.

The present invention, however, may represent the data (e.g., document content data) more abstractly and allow semantic information to be embedded in the data. This may allow the computer to help out in determining how the information is managed and make the information more useful.

There has been some effort in providing a different representation of data. For example, cascading style sheets (CSS) may separate display style from content, XML organizes information in a hierarchical form that computers can 'understand', and resource description framework (RDF) expresses the relationship of different pieces of information.

However, in contrast to these conventional efforts, the present invention may help the bulk of data (e.g., document content data) move further from being a simple "content blob" to being a data structure that computers can really work with. The present invention accomplishes this by providing novel concepts, standards, technologies and systems that moving away from the old way of thinking about data (e.g., document content data).

Specifically, the present invention may remove the formatting information from the data (e.g., document content data). This information may be added back later on. The invention may also expose to the computer the structure of the information (e.g., the tree of items nested inside items that organize the information). What is left is the raw content: the words, images and data. Further, the present invention may add into the data (e.g., document content data) semantic information and control information which may give the computer some "understanding" of what the fine grained elements of the data mean.

Others have proposed separating formatting from data (e.g., document content data), but an issue remains as to how deeply to separate the formatting. CSS moves lots of formatting from the data. However, storing the information as an XML data structure of basically nested name/value pairs is a more complete separation of formatting from data. By doing that, there is much more freedom to take the data and dramatically change the appearance or presentation of the information. This sort of deep separation may allow the present invention to render shared state information in HTML for Web browsers and open document format (ODF) for Open Office clients, and dramatically change the appearance of the data for different uses and different user preferences.

In structuring content, valuable information may be gleaned in the way books, or documents, are organized. That is, there is an order between chapters, chapters collect sections, sections gather paragraphs and paragraphs group sentences. This structure allows people to navigate the data.

Internet search engines are helpful at finding information on the Web, but search engines include some limitations. For example, search engines cannot find holes (e.g., places where a piece of information should be but is missing), and cannot really help a user find related information in a taxonomy structure of information. Modern document formats like ODF enable data (e.g., content data) structure to be exposed, but users still tend to use the documents as strings of words rather than exploiting the value of data (e.g., content data) structure.

Because there is value in the structure or organization of information, the information should be exposed so that software and actions can make use of the information. By giving a node (e.g., down to the individual sentence or data field of the tree of data (e.g., content data)) a persistent identification, software and user interfaces may be given a handle to assist in manipulating the information.

For example, one document might embed a section or paragraph of another document in itself. Subsequent changes to that paragraph can be reflected in all locations at which the paragraph appears. Similarly, if a paragraph is moved from one location to another, items that refer to that paragraph may continue to point to the correct location.

Finally, semantic information can be associated with subtrees of the content and that information can be "inherited" by all the subnodes within the subtree. Thus, for example, the system can label a document section as relating to Linux and another document section as relating to Windows, and display only the section (e.g., the Linux section or the Windows section) which is appropriate for the user.

Figure 5:
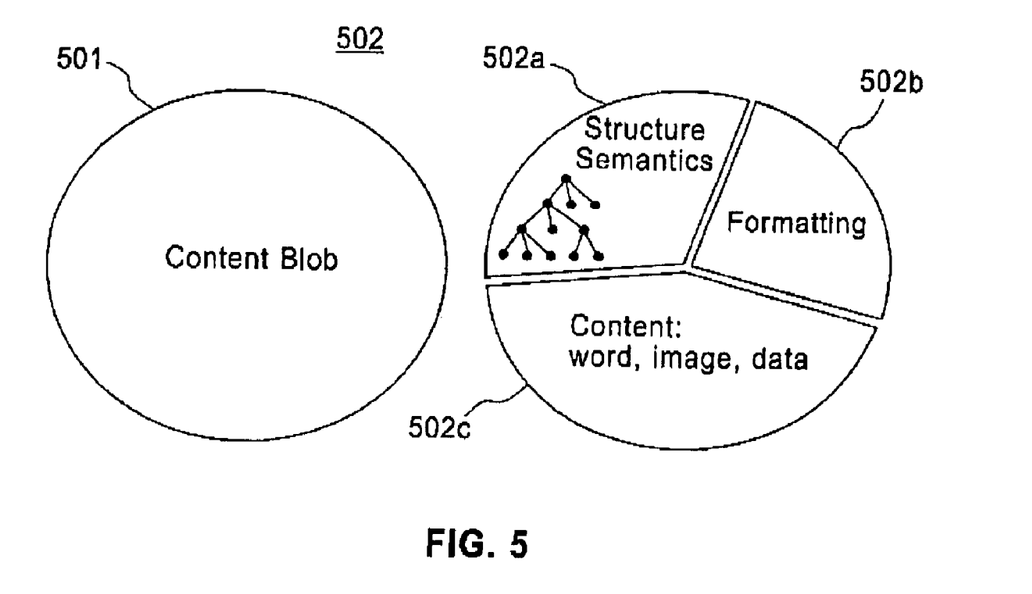
FIG. 5 illustrates the differences between data (e.g., document content data) 501 in a conventional system and data (e.g., document content data) 502 according to an exemplary aspect the present invention.

FIG. 5 illustrates the differences between data (e.g., document content data) 501 in a conventional system and data (e.g., document content data) 502 in the present invention. As illustrated in FIG. 5, the data 501 in a conventional system may be considered simply a content blob, whereas the data 502 in the present invention may include a portion 502a for storing structure semantics information, a portion 502b for storing formatting information, and a portion 502c for storing content (e.g., raw content such as words, images and data).

Thus, in contrast to the data (e.g., document content data) of a conventional system, in the present invention the data (e.g., document content data) may include raw content including words, images and data that are not lost in the blob of content.

In addition to separating out formatting information (e.g., all of the formatting information), and exposing the structure of the data to the software, the present invention may add to the document "semantic" information (e.g., information related to the data or information that describes the meaning of the raw data. For example, it may be valuable to know that a new sentence added to a paragraph is a "Question" about the content rather than an addition to the data. Another new sentence, attached to the Question, might be labeled as an "Answer".

Once the computer knows that the role of a sentence is a Question, Answer, Comment, etc, the computer can help out by at least one of: 1) formatting the questions, answers and comments appropriately, 2) allowing the content to be searched for, perhaps, questions that have no answer associated with them, or 3) filtering out comments and questions from the display. The types of information that can be added may be unlimited. Further, the information may be of general use for documents, or may be application specific.

Another type of information that is easy to build into the tree of data (e.g., document content data) is History information. When a node is inserted, replaced or deleted, the server can add the name of the person who changed it, the date it was changed and the previous version of the text to a History subnode. This allows the software to do things like: 1) render the data as it appeared at any point in time, 2) highlight recent changes, 3) filter out changes made by a given person or group of people or 4) to perhaps prevent changes to data by people other than the original author of the data.

Although the term "semantic information" is often used in a limited, Artificial Intelligence way, for purposes of the present invention, the term should be construed to have a general definition of "related to the meaning" of something. In the present invention, semantic information can be created automatically, like the History information, and other information may be provided explicitly by the user with little effort, like the Question—Answer—Comment information. Other semantic information may be provided by sophisticated software analysis of the content.

The term "metadata" is not quite right for this, since it is typically used to describe information about the data, but clearly is not part of the data. For example, data such as the size of an image, or the focal length of the lens used to capture an image might be metadata stored with the image, but such data is not part of the image.

In the present invention, the "semantic information" can be both: information about other parts of the data (at a fine grained level), as well as, 2) part of the data (e.g., information) itself. For example, the fact that a sentence is a Question about a paragraph may be a core piece of the data (e.g., a core piece of information), not some peripheral "metadata" pertaining to the document.

This novel representation of data in the present invention may be described as an "Abstract Tree", where the term "tree" emphasizes the nested nature of data structure, and the term "abstract" emphasizes that data may be less tightly bound to the visual formatting of documents for printing. The present invention may avoid the use of word "document" because the term "document" may carry too much mental baggage associated with printed documents (although the concept of XML Documents is moving further and further from traditional documents).

For example, an Abstract Tree for a multi-user game SSM Application, like a chess game, may not really be a traditional document. Instead, the abstract tree may include a structured collection of data describing the state of the pieces on the chess board, the names of the player controlling the black pieces and the player controlling the white pieces, and the player whose move is next. It is this data that includes the state information that is shared, in a very constrained manner among the players and spectators of the game.

In this exemplary SSM Application, the chess board may not be stored as an HTML document, ODF document or as an image document. The "rendering" or conversion from the abstract form to what is displayed may depend on the type of client (e.g., Web browser) that a user is using and the user's preferences. For example, a cell phone user using short message service (SMS) may use a textual representation of the chess game, where as his opponent may be using a Web browser with a graphical representation.

Another class of information that may be used in the present invention is "non-content" data (e.g., control information and information about how to execute a request). Non-content data may include, for example, 1) bindings of request names to the code that implements the request, 2) lists of subscribers and authorized users, their roles, privileges, and preferences, and 3) rules about what manipulations of the shared state are allowable and what side effects the manipulations may have.

This information (e.g., control information and information about how to execute a request) could be stored elsewhere, but it is better to store it in the data objects with the other state information. In a broad view, this information may also part of the information that defines the state of the shared application. Since this information should be available to the server when the server processes a request to change the shared state, keeping this information in the same object as the rest of the content may be convenient.

A related concept includes inheriting attributes or information for data from parent data (e.g., inheriting attributes or information for a document from a parent document). That is, a data (e.g., document content data) may be visualized as a tree, where the data's properties (e.g., font, color or author's name) are inherited or implied from parent nodes within the tree. In the same manner, a set of data may be visualized as forming a tree of data, where properties not specified in one set of data can be inherited from ancestor data.

For example, an instance of a sales contract document may have a parent document that is the boilerplate sales contract, whose parent document is the general legal document whose parent document is a master document. The editing behaviors, display layout or rendering templates for that instance of a sales contract may inherit control and formatting information from documents like the general legal document, or the master document; thus allowing behaviors to be tailored for different scopes of documents.

The present invention may also include a fine-grained access control. In theory, a system could allow anyone to change anything on a Web page, but in practice this is not likely desirable. As people start to use this data for specialized applications, the people may want to specify more detailed behaviors for how the data can be used.

An open Wiki may be great, but in some applications one might want to say that certain parts of the data in the Wiki cannot be changed, certain parts can only be edited by a certain group of people, certain parts can be changed by a user to add comments or add elements to a list but not to delete or replace elements that that user did not write, and so on. If the structure of the data is "visible" to the software and there is semantic information that identifies subtrees of the data and the author of the nodes, then the "Authorization" phase of the server's request processing can implement the access "rules" for the application.

For example, in a company's internal Web pages, the general population of employees may not add visible comments or questions to certain documents, but a set of page owners may be able to edit their pages and anyone may be able to add feedback comments and questions in context. This may be accomplished by overriding the normal Authorization phase of the editing requests for all the documents with a rule that says: "if you are not on this list of approved editors, then an 'UNAPPROVED' tag is appended to your edits".

When a user who is not an approved editor asks to see a page, or when real-time edit notifications are sent out, any node with an UNAPPROVED tag on it may be filtered out. The effect of this is that page owners can change anything and users see those changes immediately, and users can add comments and questions that are immediately visible to the page owners, but users do not see unapproved content, unless an editor removes the UNAPPROVED tag.

The present invention may also provide a novel manner of rendering data (e.g., document content data). If the data is stored abstractly it may need to be "rendered" before it can be displayed. Ideally, the rendering process may be performed in the client software on end user's machine. This offloads the servers, can make user interaction faster and can reduce the amount of data transmitted. However, with less sophisticated clients, the rendering can be done in the server.

The rendering process may include two steps: 1) filtering the abstract tree, and 2) "wrapping" the data in markup. Based on user preferences and the user's authority, various nodes in a tree may be filtered out. For example, if an unknown user wants to see a document as it appeared last Monday, without Comments, and as it applies to Linux users, the filtering process would ignore any changes made after last Monday, would remove nodes marked as comments, remove any nodes with "OperatingSystem" tags that did not contain the value "Linux", and remove nodes marked as "Confidential".

Once the tree has been filtered, the remaining nodes may be wrapped with "markup". Each node may contain a "Type" tag which may identify the role the node plays in the document. There may be sets of markup "Templates" stored with the documents or groups of documents.

Based on the Type tag and other semantic information and user preferences, a template may be selected and the value of the node and values of subfields of the node may be inserted into the template to produce the markup to display the page. This process may also be used each time a node is edited.

Thus, each user may see the shared content rendered as appropriately for himself. Some users may not be notified of a change if that change was filtered out of their view.

For example, Open Office Write users may have ODF templates to render the data (e.g., document content data). Web browser users may use a set of HTML templates. Further, multiple sets of templates could be used to provide different views on the same data.

Figure 6:
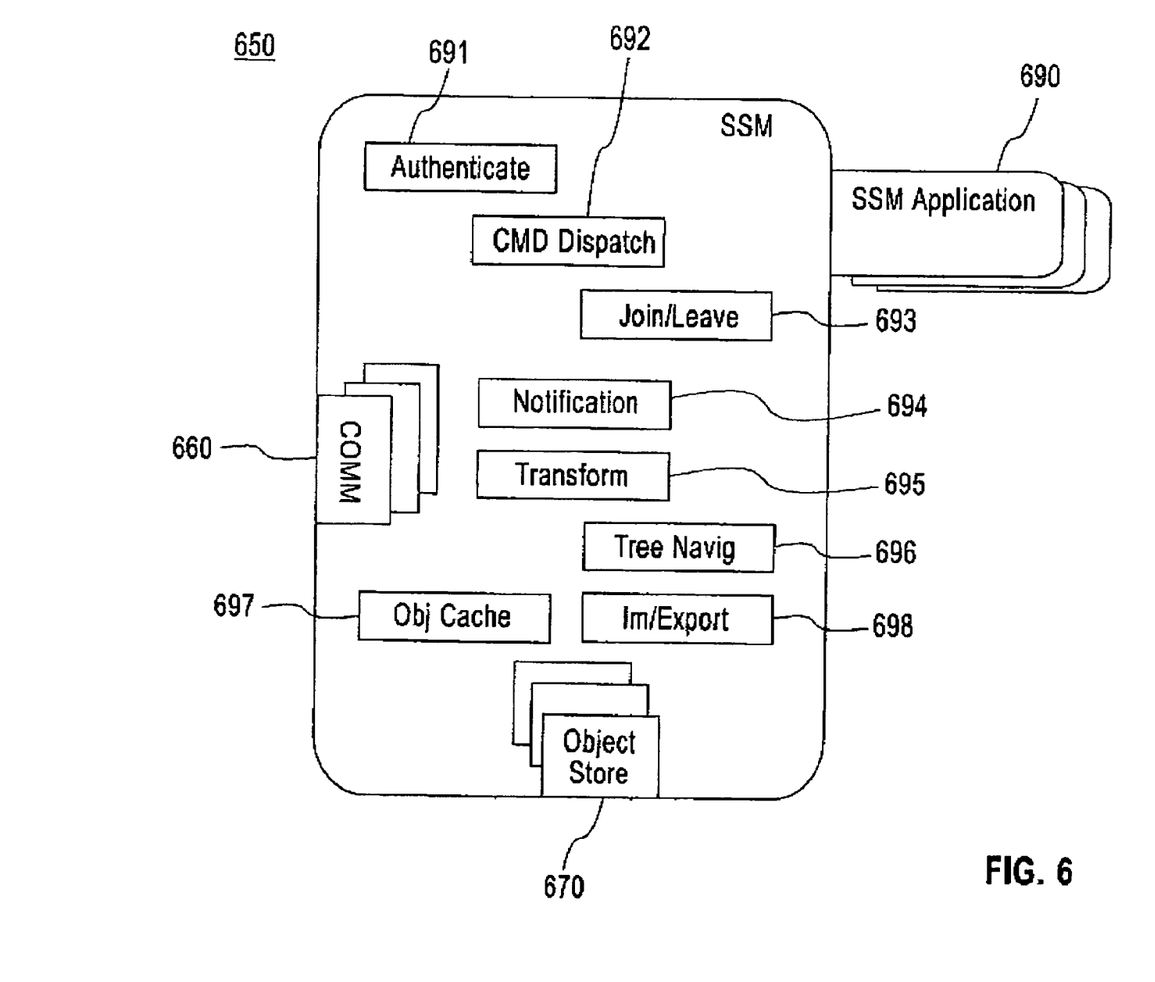
FIG. 6 illustrates a shared state manager 650 according to an exemplary aspect of the present invention.

FIG. 6 illustrates a shared state manager 650 according to an exemplary aspect of the present invention. The SSM 650 may include a communication plugin 660, object store plugin 670 and SSM Applications plugin 680. The SSM 650 may also include an authenticate module 691 for authenticating a user request, a CMD dispatch module 692, a join/leave module 693, a notification module 694 for notifying a user of a change, a transform module 695, a tree navigation module 696, an object cache 697 and an import/export module 698.

The architecture (e.g., an open architecture) illustrated in FIG. 6 shows how one can implement such a live, shared state system on the web. Although, the system may not necessarily be "open" for independent developers to create new implementations of clients, SSMs, or specialized SSM applications that will interoperate with other such systems.

Some important features for making the system open include a standard set of requests, and common data models. Items that may not be needed for openness include mandating a communication protocol, an Object Store, and a Data Storage Format. Although it may be appropriate to standardize these things, a multiplicity of protocols, storage systems and data formats can actually be beneficial, since this would mean that the architecture can unify existing systems using different protocols rather than exclude them.

An SSM application may be defined by the requests the application accepts. Sets of these request verbs and their arguments may need to be standardized, however the standard can be agnostic to issues of data model implementation. The sets of requests need to be extendable. To make an application more powerful new requests like the auction BID example need to be freely added while allowing more common requests INSERT, REPLACE and DELETE to be inherited or overridden.

A specific behavior of requests needs to be not limited by standards. A standard client may send a REPLACE request, but the behavior of REPLACE for one wiki might be honored only if the requester is the person who originally inserted the text; while the REPLACE behavior for a legal document might accept requests from any participant, but may change the text to show the author's name and the date of the change.

As illustrated in FIG. 6, the SSM 650 may include a communication plugin 660. Rather than limiting access by basing the system on one protocol, the system may accept any protocol that the system can understand. In some deployment circumstances talking plain hypertext transfer protocol (HTTP) may be best, in others session initiation protocol (SIP), Web Services, asynchronous javascript and XML (AJAX), RSS (e.g., Really Simple Syndication, Rich Site Summary, or RDF Site Summary), or some new, legacy or custom protocol may be the best single protocol to accept. In many cases accepting more than one may be better, in that it allows different sets of applications, clients and server to be bridged.

The basic communication plugin may need two methods: sendRequest and recieveRequest. The SSM and clients may not necessarily care how bytes get sent. In some cases communication plugins may not transmit or receive from remote computers, but can serve as an interface layer between other software on the same computer.

The SSM 650 may also include an object store plugin 670. As with a communication plugin 660, a multiplicity of means of "persisting" content may be permitted. In some installations the data (e.g., document content data) will be stored as XML files in a file system, and on other installations the content will be in a relational database, or a Java Content Repository.

The present invention may provide content and applications which use information that is up to date all the time. Any data that is accessible to more than one user or agent may reflect the actions that any user takes immediately.

The present invention may emerge in all sorts of Web applications, including AJAX apps, servlets, PHP apps, editors like SynchroEdit, JotSpot and subEthaEdit. To enable this sort of application the data should be to be organized appropriately. Some advances have been made in this direction in XML, Web Services, SIP, unstructured information management architecture (UIMA), and ODF.

The Shared State Manager of the present invention may provide a practical, open design tool which may integrate these advances so that it is easy to create this type of 'shared state' application in an Internet context. That is, the shared state manager may include a shared text editing SSM Application that ties together a variety of data systems (e.g., document and content systems).

Figures 7, 8:
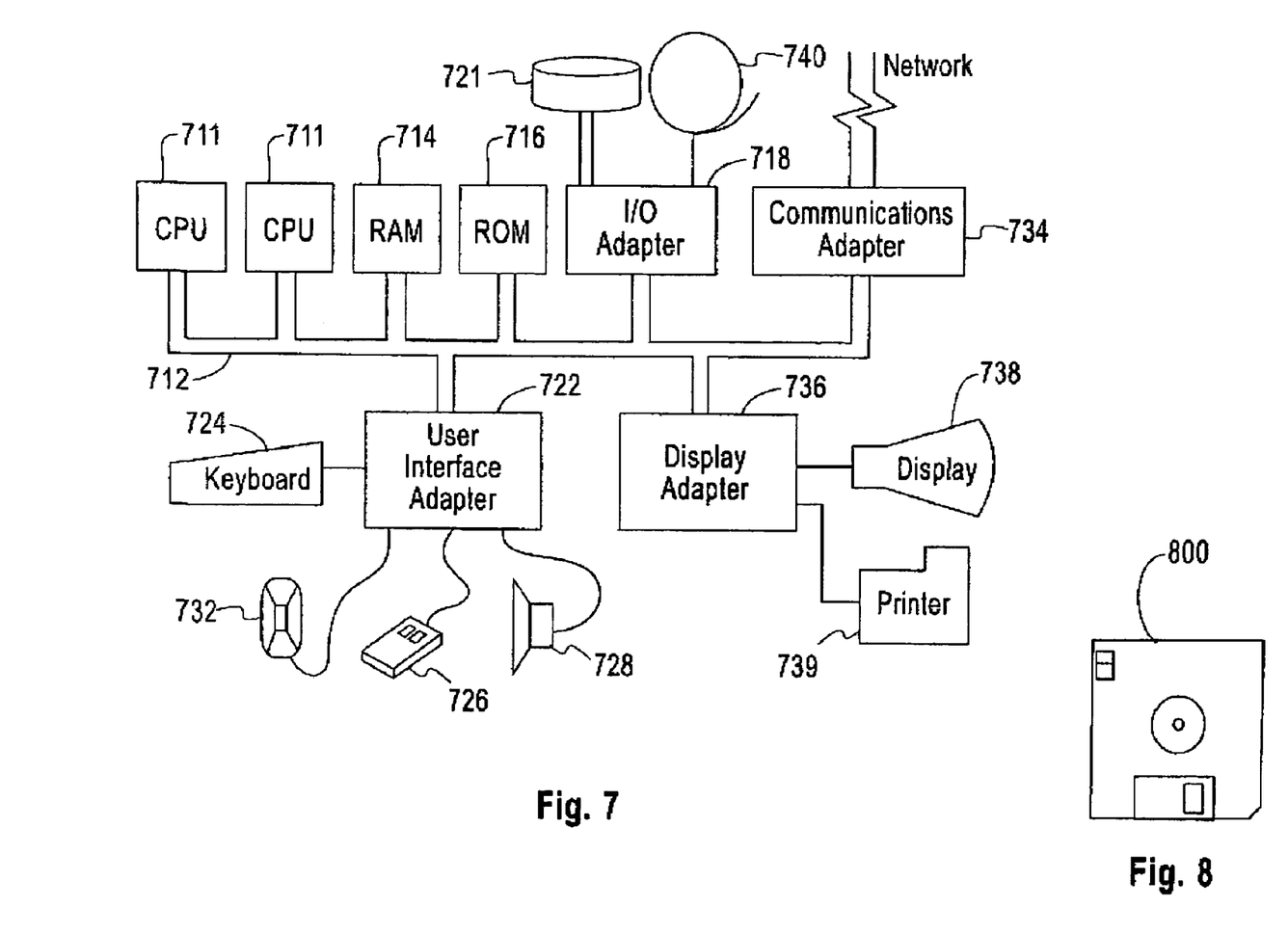
FIG. 7 illustrates a typical hardware configuration which may be used for implementing the computer system and method according to the exemplary aspects of the present invention.
FIG. 8 illustrates a programmable storage medium 800 tangibly embodying a program of machine-readable instructions executable by a digital processing apparatus to perform the computer method according to the exemplary aspects of the present invention.

Referring again to the drawings, FIG. 7 illustrates a typical hardware configuration which may be used for implementing the system and method according to the exemplary aspects of the present invention. The configuration has preferably at least one processor or central processing unit (CPU) 711. The CPUs 711 are interconnected via a system bus 712 to a random access memory (RAM) 714, read-only memory (ROM) 716, input/output (I/O) adapter 718 (for connecting peripheral devices such as disk units 721 and tape drives 740 to the bus 712), user interface adapter 722 (for connecting a keyboard 724, mouse 726, speaker 728, microphone 732, and/or other user interface device to the bus 712), a communication adapter 734 for connecting an information handling system to a data processing network, the Internet, and Intranet, a personal area network (PAN), etc., and a display adapter 736 for connecting the bus 712 to a display device 738 and/or printer 739. Further, an automated reader/scanner 741 may be included. Such readers/scanners are commercially available from many sources.

In addition to the system described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, including signal-bearing media tangibly embodying a program of machine-readable instructions executable by a digital data processor to perform the above method.

Such a method may be implemented, for example, by operating the CPU 711 to execute a sequence of machine-readable instructions. These instructions may reside in various types of signal bearing media.

Thus, this aspect of the present invention is directed to a programmed product, including signal-bearing media tangibly embodying a program of machine-readable instructions executable by a digital data processor incorporating the CPU 711 and hardware above, to perform the method of the invention.

This signal-bearing media may include, for example, a RAM contained within the CPU 711, as represented by the fast-access storage for example. Alternatively, the instructions may be contained in another signal-bearing media, such as a magnetic data storage diskette 800 (FIG. 8), directly or indirectly accessible by the CPU 711.

Whether contained in the computer server/CPU 711, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g., CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, complied from a language such as "C" etc.

In summary, an exemplary aspect of the present invention includes a system 200 having one or more clients (e.g., user interfaces) and zero or more servers where data (e.g., a state of data which may be used by a computer, such as document, email, and Web page data) can be shared between them. The "client" could be a user interface (e.g., a graphical user interface (GUI)) which a user may operate, or the client could be a computer application which may operate without a user (e.g., person).

The clients in the system 200 may communicate with a common server which may store the shared state manager (SSM). In another exemplary aspect, there may be a plurality of servers which communicate with each other and with their clients. Alternatively, there could be no central server in which case the clients could communicate peer to peer, and software (e.g., stored by a memory device associated with one of the clients) executed by a client may perform the function of a server.

In addition, the collaboration between clients may be synchronous (e.g., clients (e.g., users) working at the same time), or asynchronous (e.g., one client (e.g., user) works on the data then later another client works on the data).

Further, the clients may be homogeneous (e.g., users may all use a Web browser to view a document) or heterogeneous (e.g., one user may be viewing data (e.g., a document) in a Web browser in HTML, another user may be viewing the data (e.g., a document) in Microsoft Word and a third user may be viewing the data (e.g., a document) by using a special purpose graphics user interface). Because the system can maintain the shared state in an "abstract" form (e.g., devoid of formatting "markup" information) and can "render" the data using templates designed to convert the "view" of the data in different formats, the system can support collaboration between homogenous and/or heterogeneous clients.

In the system 200, the views or presentation of the information may be different for different clients. That is, because the structure of the content may be known to the system, and because semantic information (also known as "metadata") can be integrated with the data at a fine level of granularity, the system can render different views of the state information based on the user's preferences, role, access rights or user interface. For example, if subtrees of the data were tagged with "educational level" and last edit date, one user could view the data (e.g., document content data) at a high school level with recent changes highlighted while another user could view the data at a college level as it appeared last January, with nodes labeled as comments displayed as icons.

Further, the system 200 may include a plurality of clients using a plurality of Web browsers to view data (e.g., simultaneously view the same document content data). That is, one or more clients (e.g., user) can alter the data and those alterations may be reflected (e.g., instantly reflected) on the other clients' (users') browsers without their needing to refresh the display.

In short, the system 200 may allow people or programs to work together synchronously or asynchronously to collaboratively edit data (e.g., edit content of a document such as a Web page). When used for collaboration on Web pages, the invention may permit any number of clients (e.g., users) viewing the same Web page to edit or annotate the page with fine grained control and may reflect those changes to all users instantly (e.g., within a few seconds), without the users needing to refresh their screens.

With its unique and novel features, the present invention provides a system and method for collaboration which may help to provide an improved "interactivity" between clients on a network (e.g., the Internet) and/or between a client and a server on the network.

While the invention has been described in terms of one or more exemplary embodiments, those skilled in the art will recognize that the invention can be practiced with modification within the spirit and scope of the appended claims. Specifically, one of ordinary skill in the art will understand that the drawings herein are meant to be illustrative, and the design of the inventive assembly is not limited to that disclosed herein but may be modified within the spirit and scope of the present invention.

Further, Applicant's intent is to encompass the equivalents of all claim elements, and no amendment to any claim the present application should be construed as a disclaimer of any interest in or right to an equivalent of any element or feature of the amended claim.

What is claimed is:

1. A shared state manager (SSM) for collaboration, said shared state manager comprising:
    a storage device for storing a shared state object (SSO) comprising an abstract representation of a shared state of data which is shared by a plurality of clients which are authorized to edit the data, the abstract representation identifying the plurality of clients and their privileges;
    an updating module for updating the shared state of data by updating the abstract representation of the shared state based on a request to edit said data made by a client in the plurality of clients; and
    a notifying module for, upon said updating said shared state, notifying another client in the plurality of clients of said updated shared state,
    wherein the updating module separates formatting information and content in the shared state of data, and the abstract representation comprises the formatting information, the content, and semantic information which describes a meaning of the content, and
    wherein the abstract representation comprises an abstract tree representation, and the semantic information is associated with a subtree of the shared state of data and is inherited by subnodes within the subtree.

2. The shared state manager of claim 1, further comprising:
    an authorization module for confirming an authorization of said request; and
    a reply module for generating a reply to said request to said client.

3. The shared state manager of claim 1, wherein said client comprises one of a browser, an editor, a graphical-based client, a text-based client, and a server.

4. The shared state manager of claim 1, wherein said shared state of data comprises a shared state of document content data.

5. The shared state manager of claim 4, wherein at least one of said client and said another client comprise:
    a storage module for storing SSM application software for controlling said request to edit said document content data, and causing said notifying module to notify said another client of said updated state of document content data; and
    a storage module for storing a shared state object (SSO) comprising a representation of said shared state of said document content data.

6. The shared state manager of claim 4, wherein said shared state manager is included in a server in a network, said server comprising:
    a storage device for storing SSM application software for controlling said request to edit said shared state of said document content data, and causing said notifying module to notify said another client of said updated state of said document content data.

7. The shared state manager of claim 6, wherein said network comprises the Internet, and said document content data comprises Web page content data for a Web page which is accessible by said client and said another client via the Internet.

8. The shared state manager of claim 7, wherein said client and said another client comprise a Web browsing application for inputting a request to edit said Web page content data and viewing said Web page content data.

9. The shared state manager of claim 8, wherein said notifying said another client of said updated state comprises updating a view of said Web page content data generated by said Web browsing application on said another client.

10. The shared state manager of claim 9, wherein said another client comprises a plurality of other clients, and
    wherein said notifying module updates in real time a view of said Web page content data on said client and said plurality of other clients to reflect said updated state of said Web page content data without refreshing a Web page comprising said Web page content data.

11. The shared state manager of claim 1, wherein said shared state object comprises metadata integrated with said data, such that said notifying said another client of said updated state comprises rendering a different view of said data based on one of a user preference, user role, user access right, and a configuration of said another client.

12. The shared state manager of claim 1, wherein a tree in said shared state object is tagged with information for controlling a view of said data.

13. The shared state manager of claim 1, wherein the updating module performs one of creating the semantic information automatically, receiving the semantic information from the client, and generating the semantic information by analyzing the content.

14. The shared state manager of claim 1, wherein the abstract representation of the shared state of data comprises state information having an order or structure which is different than the shared state of data.

15. The shared state manager of claim 1, wherein the shared state of data comprises a hypertext markup language (HTML) page, and a correspondence between nodes of the SSO and a document object model (DOM) of the HTML page is other than one-to-one.

16. A system for collaboration, comprising:
    a plurality of clients which are authorized to edit data; and
    a server connected to a network, said server comprising:
        a shared state manager (SSM) for collaboration, said SSM being accessible by said plurality of clients and comprising:
            a storage device for storing a shared state object (SSO) comprising an abstract representation of a shared state of the data which is shared by the plurality of clients, the abstract representation identifying the plurality of clients and their editing privileges;

an updating module for updating the shared state of data by updating the abstract representation of the shared state based on a request to edit said data made by a client in the plurality of clients; and a notifying module for, upon said updating said shared state, notifying another client in the plurality of clients of said updated shared state, wherein the updating module separates formatting information and content in the shared state of data, and the abstract representation comprises the formatting information, the content, and semantic information which describes a meaning of the content, and wherein the abstract representation comprises an abstract tree representation, and the semantic information is associated with a subtree of the shared state of data and is inherited by subnodes within the subtree.

17. The system of claim 16, wherein said shared state comprises a shared state of content data for a document.

18. The system of claim 16, wherein said shared state manager (SSM) further comprises
a storage device for storing SSM application software for controlling said request to edit said data, and causing said notifying module to notify said another client of said updated state of said data; and
a storage device for storing a shared state object (SSO) comprising a representation of said shared state of said data.

19. A method of collaboration, comprising:
storing a shared state object (SSO) comprising an abstract representation of a shared state of data which is shared by a plurality of clients which are authorized to edit the data, the abstract representation identifying the plurality of clients and their privileges;
updating the shared state of data by updating the abstract representation of the shared state based on a request to edit said data made by a client in the plurality of clients; and
upon said updating said shared state, notifying another client in the plurality of clients of said updated shared state,
wherein the updating of the shared state of data comprises separating formatting information and content in the shared state of data, and the abstract representation comprises the formatting information, the content, and semantic information which describes a meaning of the content, and
wherein the abstract representation comprises an abstract tree representation, and the semantic information is associated with a subtree of the shared state of data and is inherited by subnodes within the subtree.

20. The method according to claim 19, wherein said shared state of data comprises a shared state of document content data.

21. The method according to claim 19, further comprising:
confirming an authorization of said request; and
generating a reply to said request to said client.

22. The method according to claim 19, further comprising:
storing application software for controlling said request to edit said data.

23. The method according to claim 19, further comprising:
storing a shared state object (SSO) comprising a representation of said shared state of said data.

24. The method according to claim 19, wherein said notifying said another client of said updated state comprises filtering and translating an abstract representation of said data into a plurality of different presentation formats for viewing said updated update state of said data.

25. A non-transitory programmable storage medium tangibly embodying a program of machine-readable instructions executable by a digital processing apparatus to perform a method of collaboration, said method comprising:
storing a shared state object (SSO) comprising an abstract representation of a shared state of data which is shared by a plurality of clients which are authorized to edit the data, the abstract representation identifying the plurality of clients and their privileges;
updating the shared state of data by updating the abstract representation of the shared state based on a request to edit said data made by a client in the plurality of clients; and
upon said updating said shared state, notifying another client in the plurality of clients of said updated shared state,
wherein the updating of the shared state of data comprises separating formatting information and content in the shared state of data, and the abstract representation comprises the formatting information, the content, and semantic information which describes a meaning of the content, and
wherein the abstract representation comprises an abstract tree representation, and the semantic information is associated with a subtree of the shared state of data and is inherited by subnodes within the subtree.

26. A method of deploying computing infrastructure in which computer-readable code is integrated into a computing system, such that said code and said computing system combine to perform a method of collaboration, said method of collaboration comprising:
storing a shared state object (SSO) comprising an abstract representation of a shared state of data which is shared by a plurality of clients which are authorized to edit the data, the abstract representation identifying the plurality of clients and their privileges;
updating the shared state of data by updating the abstract representation of the shared state based on a request to edit said data made by a client in the plurality of clients; and
upon said updating said shared state, notifying another client in the plurality of clients of said updated shared state,
wherein the updating of the shared state of data comprises separating formatting information and content in the shared state of data, and the abstract representation comprises the formatting information, the content, and semantic information which describes a meaning of the content, and
wherein the abstract representation comprises an abstract tree representation and the semantic information is associated with a subtree of the shared state of data and is inherited by subnodes within the subtree.

* * * * *